United States Patent [19]
Marchal

[11] Patent Number: 6,068,735
[45] Date of Patent: May 30, 2000

[54] DUST-CONTROLLING APPARATUS, WITH A WATER CURTAIN DEVICE, FOR A PAPER MANUFACTURING MACHINE

[75] Inventor: Paul Marchal, Leimbach, France

[73] Assignee: Fort James France, Courbevoie, France

[21] Appl. No.: 09/017,024

[22] Filed: Feb. 2, 1998

[30] Foreign Application Priority Data

Feb. 3, 1997 [FR] France .................................. 97 01171

[51] Int. Cl.[7] ...................................................... D21F 7/00
[52] U.S. Cl. .............................. 162/272; 34/117; 34/119; 96/328; 162/281; 162/283
[58] Field of Search .................... 162/283, 272, 162/275, 280, 281; 34/117, 119; 96/322, 327, 328

[56] References Cited

U.S. PATENT DOCUMENTS

| | | | |
|---|---|---|---|
| 4,019,953 | 4/1977 | Nystrom | 162/272 |
| 4,290,784 | 9/1981 | Rawicki | 96/322 |
| 4,906,333 | 3/1990 | Myren | 162/272 |
| 5,011,574 | 4/1991 | Gustavsson et al. | 162/281 |
| 5,286,268 | 2/1994 | Watanabe | 96/328 |
| 5,466,298 | 11/1995 | Pollock | 134/15 |
| 5,759,352 | 6/1998 | Lau et al. | 162/272 |
| 5,846,303 | 12/1998 | Milojevic | 96/327 |

Primary Examiner—Karen M. Hastings
Attorney, Agent, or Firm—Breiner & Breiner

[57] ABSTRACT

A dust and fiber control device for paper making apparatus is described. The device includes a wall in conjunction with a feed spout for providing a water curtain. The water curtain serves to capture and remove air suspended dust and fiber particles from ambient air. The device is positioned transversely to the motion of a paper web underneath the web between a drying cylinder and a rewinder. The water curtain device is utilized in conjunction with air flow devices for assisting in controlling the collection of air suspended dust and fiber particles from the ambient air.

17 Claims, 2 Drawing Sheets

DUST-CONTROLLING APPARATUS, WITH A WATER CURTAIN DEVICE, FOR A PAPER MANUFACTURING MACHINE

FIELD OF INVENTION

The invention relates to dust-controlling apparatus mounted on a machine for making creped paper.

BACKGROUND OF INVENTION

More specifically, the invention concerns a machine for the continuous manufacture of creped paper wherein following formation, draining and any partial drying, the web is applied against a suitably heated drying cylinder. Following drying, the web is detached from the cylinder by a creping blade scraping the cylinder surface at an appropriate angle. Thus detached and creped, the web is longitudinally moved to a rewinder.

Furthermore, cellulose wadding or tissue paper for domestic or sanitary uses, for example toilet paper, paper towels, handkerchiefs, napkins, and the like, are manufactured in the above manner.

By scraping the cylinder, the creping blade detaches the web and forms crepe lines. The blade also tears off dust and paper fiber particles in varying degrees depending on the pulp grade, the web's dryness, and any added loosening agents used to improve softness. A portion of the dust and fibers will tend to follow the paper path and the paper on account of the paper's high speed dragging along an air layer at each of its two sides. This moving air mass carries much dust.

However, even larger quantities of dust or larger fiber accumulations may be produced in the vicinity of the creping blade in a zone present between the detached paper web and the cylinder below the two surfaces.

Accordingly, dust so created is likely to accumulate on the paper-producing equipment and within the building housing the equipment. The dust creates a disadvantageous environment for workers around the equipment or in the building.

Moreover, the dust and torn-off fibers are highly flammable and susceptible to the least spark, in particular, between the creping blade and the drying cylinder, or in any other region of the equipment or building wherein they accumulate.

Generally, a drying cylinder is fitted with a drying hood representing another ignition source of dust accumulating on the equipment.

Lastly, these undesirable fiber particles may hamper proper operation of the equipment or they may degrade the final paper quality.

To confine dust dispersion, it has already been suggested to confine the equipment per se to preclude the dust from dispersing into the entire building. Hoods have been mounted on the machine parts between the heating cylinder and the rewinder as well as on the reel itself. Suction boxes producing advantageous air circulation are present inside these enclosures. These means are fairly effective to prevent dust from reaching the machine room and in restricting the danger of fire. However, the accumulation of dust and torn-off fibers on the machine per se remains a big unsolved problem.

Obviously dust accumulation is especially significant in the vicinity and just below the creping blade.

U.S. Pat. No. 5,011,574 already has proposed a creped paper making machine fitted with a suction dust control of which the air intakes are present in the immediate vicinity of the creping blade.

Another patent document, namely EP-A-0 310 161, discloses apparatus to aspirate dust in the air layer moving along the paper path.

U.S. Pat. No. 5,466,298 describes dust control apparatus for a paper web wherein compressed air is blown in very near one of the paper web sides to oppose the air flow following the paper path. By being mixed with the compressed air, the air mass is stopped and then aspirated by an adjacent suction device.

While the above techniques taken together allow reducing the dust generated at the facility or accumulating on the machine, they also require processing very large air masses and entail dust removal. The control of the above boxes is very difficult and they are easily clogged by dust or fiber aggregations. Moreover, being localized applications, they do not solve the overall problem of dust generation from the paper creping operation.

OBJECTS AND BRIEF DESCRIPTION OF THE INVENTION

To offer a solution to the problems of dust creation in the creping operation of paper, the invention proposes dust control apparatus for a machine of the above described species. The apparatus is characterized by a device forming a water curtain to capture and remove the air-suspended dust and fiber particles. The device is mounted transversely to the motion of the paper web underneath the web between the cylinder and the rewinder.

Such apparatus offers many advantages. It was found to be highly efficient in removing suspended fiber particles, in particular when the water flow of the water curtain along a wall provided is turbulent. The apparatus also allows evacuating larger accumulations and averts accumulations that might interfere with machine operation.

Other features of the invention are as follows:

the water curtain forming device includes a substantially vertical wall and a water feed with a spout mounted in such a manner as to form a continuous film or layer of water which is homogeneous and permanent along the wall;

the water curtain forming device is mounted underneath a creping blade, thereby allowing capture directly of dust and fiber accumulations produced in this zone;

a collector to receive and evacuate liquid flowing from the wall is mounted underneath the wall while subtending an air passage, the collector advantageously being a tub having a bottom which slants in order to make the liquid flow toward a white water recovery pit, and is mounted underneath the wet and press sections before the drying cylinder; this collector being fitted with water sprinkling manifolds to evacuate accumulated fibers dropped by the water curtain;

devices to generate downward air flows at least in a zone near the water curtain forming device to enhance capture of fiber particles suspended in the air;

and, in particular, a device to generate air flow in the vicinity of the lower side of the paper web to detach or displace air flow elements following the paper path and including a compressed or booster air injector mounted near and below the blade;

another device to generate air flow and simultaneously to assure evacuation of a portion of the suspended particles and including a suction box mounted to the rear of the water curtain in such a manner as to aspirate the air within the enclosure bounded by the water curtain, by a partition separating the machine's wet part, by the cylinder and the ground, the air in particular coming from the passage between the partition and the collector;

and, in particular, apparatus including in a known manner a brokes pit to recover paper trimmings, an air injector being mounted underneath the water curtain and away from the water curtain while pointing downward to drag air along the water curtain toward the brokes pit, wherein in this design, a suction box is mounted underneath the air injector; in the latter case the invention is especially effective in evacuating paper trimmings towards the brokes pit when there is deliberate or accidental web rupture;

an aerodynamic guide out of contact with the web and mounted above the web, and generally called a "foil", is arranged immediately underneath the web cutting blade and runs toward the thickness-measuring scanner, this design assuring high web stability despite air being injected nearby; this support preferably includes a component pivoting about a transverse axis to open a passage to the brokes pit when the cutting blade is used to detach the web from the drying or heating cylinder in order to replace or clean the creping blade.

BRIEF DESCRIPTION OF THE DRAWINGS

Other features and advantages of the invention are elucidated in the detailed description below which is illustrated in the attached drawings.

DETAILED DESCRIPTION OF PRESENTLY PREFERRED EMBODIMENTS

Figure 1:
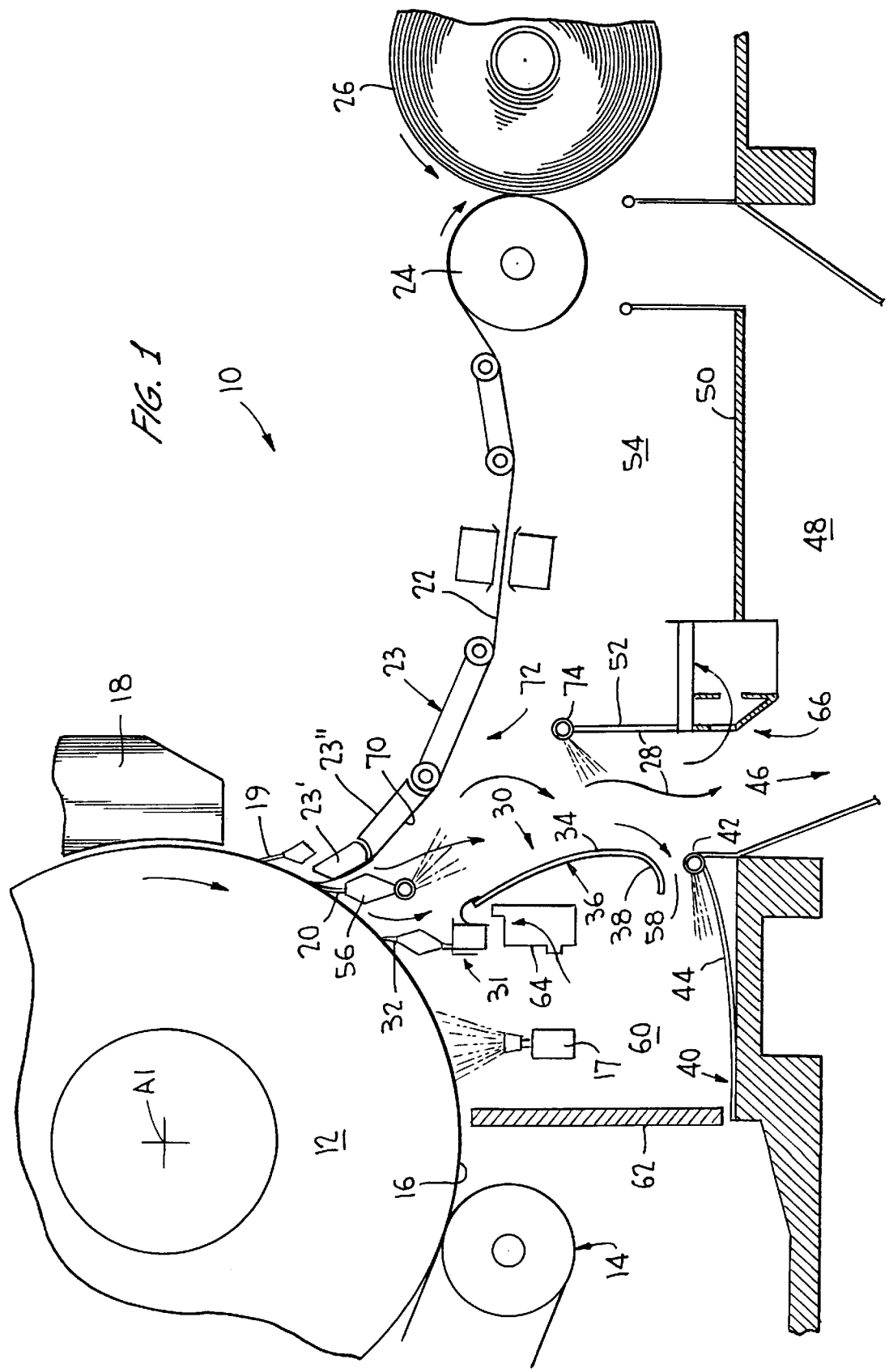
FIG. 1 is a schematic side view of part of a continuous crepe paper manufacturing facility of the invention.

Part of a continuous crepe paper manufacturing facility 10 is shown in FIG. 1.

More specifically, the shown facility includes a dry section downstream of a papermaking machine with a drying cylinder 12 of a type known as "yankee". The drying cylinder 12 is driven into clockwise rotation as shown in FIG. 1 about its transverse axis A1.

A compressing cylinder 14 applies a still moist web against the outer cylindrical surface 16 of the drying cylinder 12, a set of atomizers 17 shown upstream having previously deposited a layer of an appropriate adhesive. Thereupon, the paper web moves with the cylinder, initially along a rising path.

A heating hood 18 covering the upper portion of the cylinder 12 dries the web together with the cylinder. The web is dried to an approximate dryness of 95% and is transformed into a paper web requiring detachment from the cylinder 12.

For that purpose, a creping blade 20, also called doctor blade, is forced against the outer surface 16 of the cylinder 12. The paper web is thereby detached from the cylinder and creped and, thereafter, is longitudinally guided forward in the direction of a rewinder 24 with which to make paper reels 26. Web guides 23 are present downstream of the creping blade 20 to stabilize the paper web. Advantageously such guides 23 (also called "foils") are aerodynamic, make no contact with the web, are located above the web, and run downstream from the web-cutting blade 19 which in turn is mounted above the creping blade. In the facility shown, the foil 23 includes a shoe-shaped upstream portion 23' mounted immediately below the cutting blade 19 and is followed by a part 23" pivotable about a transverse axis. Part 23" allows opening a passage and the continued detaching of the web from the cylinder by cutting the web using cutting blade 19 when the creping blade must be changed or cleaned. In this manner, the opening allows removing of the web until production resumes.

Creping the web 22 generates much paper dust and torn-off fibers, in particular, in the region underneath paper web 22 and underneath cylinder 12. Dust and other accumulating materials also are produced by the cleaning blade 32 located downstream of the web's detachment point.

In the light of the present disclosure, the facility 10 includes a region 28 within which air is circulating to guide much of the dust produced toward a water curtain forming device acting as a dust trap 30.

This region 28 is bounded in its upper area and in the forward direction by the paper web 22. To the rear of the creping blade 20, this region is bounded by the cylindrical surface 16 from which the web 22 was detached. This surface 16 is cleaned by the cleaning blade 32 which is mounted to the rear of the creping blade 20 and of which the function is to remove any traces of paper remaining on the cylinder 12 following detachment of the paper web 22.

The water curtain device 30 is mounted just underneath the cleaning blade 32. Water flows along the front side of a substantially vertical orienting wall 36 which furthermore bounds the air circulation zone 28 at the rear. The wall can be implemented using plastic or metal sheet or plate, which is preferably smooth and polished to avoid any roughness on which dust and fiber particles dragged downstream by the water of the water curtain might snag once the curtain begins moving the particles.

Figure 2:
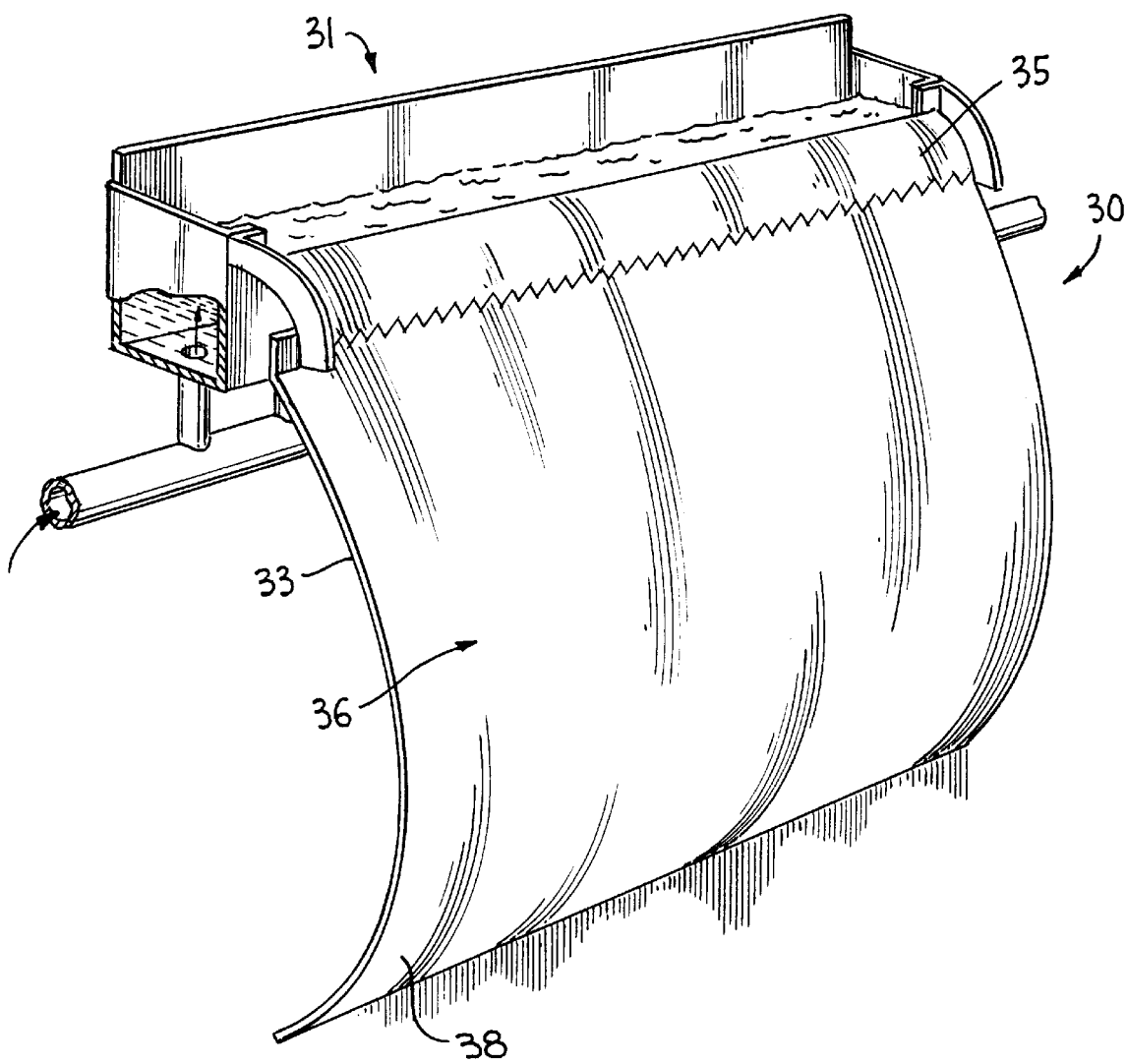
FIG. 2 is a schematic perspective view of an illustrative embodiment of a device of the invention forming a water curtain.

The water curtain device 30 is shown in further detail in FIG. 2 and includes a horizontal feed spout 31 running along an upper edge 33 of the wall 36. When filled, advantageously with clarified water, the spout 31 spills over its entire length a forward edge 35 which acts as a spillway curving downward in such a manner as to pour a water curtain on the front side 34 of the wall 36. To improve flow properties and to facilitate forming a homogeneous and turbulent water layer or film, the lower edge of the spillway is serrated. A turbulent film flowing at a rate between 5 and 10 $m^3/h$ per meter of width of the machine seems to be advantageous to avert accumulating dust, fibers or bits of paper.

Rather than being a plane, wall 36 is preferably convex and turns inward at its lower portion 38. The lower portion of wall 36 overhangs an evacuation collector of the accumulated dust and fibers while subtending an air passage 58. This collector 40 includes a liquids receiver of which the bottom 44 slopes and is directed toward the wet part of the papermaking machine. The collector includes a sprinkling manifold 42 advantageously fed with clarified water to assist in removing the accumulated dust. The sprinkling manifold is mounted substantially underneath the lower portion 38 of the wall 36 whereby the collector 40 runs to the rear of the wall 36. The intake 46 of a brokes pit 48, for recovering paper trimmings when the web is deliberately or accidentally ruptured, is located substantially in the extension of the wall 36. The brokes pit 48 may also receive part of the fibers torn off the paper by the creping blade 20, at least those having a weight large enough so as not to be dragged along by the air circulating around the creping blade 20.

A transverse service platform 50 is present before the air circulation zone 28 and runs above the brokes pit 48 and underneath the paper web 22 being guided toward the rewinder 24. Platform 50 allows operator-access to the machine and includes a safety banister fitted with a smooth vertical plate or sheetmetal 52 which bounds the air circulation zone 28 at the front.

The service platform 50 allows an operator access for service in a space 54 substantially underneath the paper web 22 at the front of the air circulation zone 28.

According to the disclosure of the invention, means are provided to set up air flows in the air circulation zone 28 to guide the dust in particular in the direction of the water curtain device 30.

In this manner, a first top-to-bottom air flow is created in air circulation zone 28 by a first air injection manifold 56 mounted immediately underneath the creping blade 20 and injecting compressed or booster air downward between the paper web 22 and the water curtain 30. This injection provides a large quantity of air from the machine side. The air flow generated by the first air injection manifold 56 also allows at least partial detachment of the airstream elements (e.g. dust, fiber particles) moving along the lower side 70 of the paper web 22 on account of the web's motion. The positioning of the aerodynamic support 23 directly downstream of the webcutting blade 19 allows efficient operation of the air injector 56. In absence of support 23, the web would lack stability and the quantity of injected air then would have to be restricted.

Two air suction regions are present at the bottom of the zone 28. The first one generates a large air flow in the cross-sectionally small passage 58 between the lower part 38 of the water curtain wall 36 and the collector 40.

To achieve this purpose, a substantially vertical wall 62 is mounted to the rear of the wall 36 to bound a substantially sealed enclosure 60. Enclosure 60 is longitudinally bounded at the front by wall 36, at the rear by partition 62, vertically bounded at the top by cylinder 12, and at the bottom by the upper side of bottom 44 of the collector 40.

Enclosure 60 is maintained at a partial vacuum relative to the air circulation zone 28 by a suction box 64. In this manner, substantial suction is achieved across the passage 58 underneath the water curtain between the air circulation zone 28 and the rear enclosure 60. Another function of the suction box is to eliminate the dust and moisture particles generated in the vicinity of this enclosure. The suction box communicates with a vacuum source through an appropriate separator eliminating the essentially fibrous solid particles from the liquid particles dragged along in the air flow. The air flow through the suction box is between 1000 and 3000 $m^3/h$ per $m^2$.

As shown in the Figures, lower part 38 of wall 36 of trap 30 is convex, curving rearward so that the top-to-bottom air flow tends to hug so well the contour of wall 36 that the dust carried in this air flow is likely to be captured by the water curtain or film moving along the front side 34 of trap 30.

When the water of the water curtain arrives at the bottom of wall 36, the water drops into the evacuation collector 40 while also forming a water barrier across the break 58 through which moves a large part of the air flow.

As shown in FIG. 1, a second suction box 66 is mounted at the intake 46 of brokes pit 48. Being mounted bottommost in the air circulation zone 28 and in front of same, the second suction box allows collection of that portion of the air flow that is not aspirated by rear enclosure 60. Suction box 66 also makes it possible to aspirate the suspended dust in the brokes pit 48.

The apparatus of the invention includes devices with which to generate an air flow in the air circulation zone 28 that moves substantially in an opposite direction to the motion of the paper web 22 in such a manner as to preclude the dust from being dragged outside the circulation zone 28.

Be it noted in this respect that the plate or sheetmetal 52 mounted along the banister of platform 50 together with paper web 22 defines a break 72 between the air circulation zone 28 and space 54 defined above platform 50.

A second compressed or booster air manifold 74 is mounted along an upper edge of plate or sheetmetal 52 which is located opposite the lower side 70 of the paper web 22 in such a manner that the air is projected inside the air circulation zone 28. In particular, the air projection is downward and rearward, substantially in the direction of the water curtain.

In this manner, in combination with the partial vacuum created by air suction at the bottom of zone 28, an air flow is set up near the break 72 which moves along the lower side 70 of the paper web 22 from the front space 54 toward the air circulation zone 28, that is opposite the direction of motion of the paper web 22. In this manner, the air flow causes detachment of air filaments which normally tend to follow the motion of the paper web 22, the filaments being deflected inward and toward the bottom of the air circulation zone 28 to be aspirated either through passage 58 or through the second suction device 66.

Therefore, the configuration of the air circulation zone 28 makes it possible to recover a large portion of the dust formed by paper creping using the water curtain 30 and evacuating the dust by means of evacuation collector 40.

As regards apparatus using solely suction boxes to evacuate the dust, it is feasible in this manner to very substantially lower the air circulation volume, where this volume intrinsically requires processing in order not to expel the dust into the atmosphere. This feature is a substantial economic advantage. obviously, too, the water curtain 30 herein in the form of a film running on a substantially vertical wall also can be implemented by other equivalent techniques.

Moreover, a dust recovery and evacuation system as described above offers the advantage of being easily retrofitted onto existing equipment. It is also compatible with known containment apparatus of such facilities.

As will be apparent to one skilled in the art, various modifications can be made within the scope of the aforesaid description. Such modifications being within the ability of one skilled in the art form a part of the present invention and are embraced by the appended claims.

It is claimed:

1. An apparatus for continuously manufacturing paper comprising a drying cylinder, a doctor blade and a rewinder, wherein a paper web following drying is detached by the doctor blade from the drying cylinder and is spooled by the rewinder; said apparatus further comprising dust-control apparatus including a device forming a water curtain to capture and drag along dust and fiber particles suspended in ambient air, said device being mounted transversely to a direction of motion of the paper web and underneath the paper web between the drying cylinder and the rewinder, said dust control apparatus being structured and arranged to remove dust from the ambient air in an area under the doctor blade and in an area downstream of the drying cylinder.

2. Apparatus as claimed in claim 1 wherein the device comprises a substantially vertical wall and a water supply device having a spillway mounted to form a layer of flowing water on one side of the wall.

3. Apparatus as claimed in claim 2 wherein water flow along the wall is turbulent.

4. Apparatus as claimed in claim 1, 2 or 3 wherein the device is mounted under the doctor blade.

5. Apparatus as claimed in claim 4 wherein a liquid collector is mounted under the wall while subtending an air passage.

6. Apparatus as claimed in claim 5 wherein the liquid collector includes a water sprinkling manifold.

7. Apparatus as claimed in claim 1 further comprising an injector, located beneath said paper web and above said water curtain, for generating downward air circulation at least in a zone adjacent the device in such a manner as to enhance capture of said dust and fiber particles.

8. Apparatus as claimed in claim 4 further comprising an air injector mounted adjacent and under the doctor blade to generate an air flow adjacent a lower side of the paper web downstream of the doctor blade to displace from the air flow said dust and fiber particles that follow motion of the paper web.

9. Apparatus as claimed in claim 5, 6 or 7 further comprising an air injector mounted adjacent and under the doctor blade to generate an air flow adjacent a lower side of the paper web downstream of the doctor blade to displace from the air flow said dust and fiber particles that follow motion of the paper web.

10. Apparatus as claimed in claim 4 further comprising a suction box associated with an air passage and mounted rear of the wall in such a manner as to aspirate air in an enclosure bounded by the wall, a substantially vertical partition, the drying cylinder and a support surface.

11. Apparatus as claimed in claim 5, 6, 7 or 8 further comprising a suction box associated with an air passage and mounted rear of the wall in such a manner as to aspirate air in an enclosure bounded by the wall, a substantially vertical partition, the drying cylinder and a support surface.

12. Apparatus as claimed in claim 4 further comprising a brokes pit to recover paper trimmings, an air injector mounted under the device and being oriented downward to generate air flow along the device toward said brokes pit.

13. Apparatus as claimed in claim 5, 6, 7, 8 or 10 further comprising a brokes pit to recover paper trimmings, an air injector mounted under the device adjacent an intake to the brokes pit and being oriented downward to generate air flow along the device toward said brokes pit.

14. Apparatus as claimed in claim 8 further comprising an air and fiber particles suction box mounted under the air injector.

15. Apparatus as claimed in claim 9 further comprising an air and fiber particles suction box mounted under the air injector.

16. Apparatus as claimed in claim 1 further comprising a web cutting blade mounted above the doctor blade, and an aerodynamic guide out of contact with the paper web and extending under and forward of the web cutting blade.

17. Apparatus as claimed in claim 16 wherein said guide comprises a first part pivoting about an outer axis to open an evacuation passage for the paper web in case of detachment of the paper web by the web cutting blade.

\* \* \* \* \*

UNITED STATES PATENT AND TRADEMARK OFFICE
CERTIFICATE OF CORRECTION

PATENT NO. : 6,068,735
DATED : May 30, 2000
INVENTOR(S) : Paul Marchal

Page 1 of 1

It is certified that error appears in the above-identified patent and that said Letters Patent is hereby corrected as shown below:

<u>Column 7, claim 4,</u>
Line 7, delete "1,".

Signed and Sealed this

Eighteenth Day of September, 2001

Attest:

*Nicholas P. Godici*

NICHOLAS P. GODICI
*Attesting Officer*   *Acting Director of the United States Patent and Trademark Office*